United States Patent
Kogan et al.

(10) Patent No.: US 10,916,259 B2
(45) Date of Patent: Feb. 9, 2021

(54) EXTRACTING OVERALL EQUIPMENT EFFECTIVENESS BY ANALYSIS OF A VIBRO-ACOUSTIC SIGNAL

(71) Applicant: 3D SIGNALS LTD., Kfar Saba (IL)

(72) Inventors: Gideon Genadi Kogan, Kfar Saba (IL); Amnon Hanoch Shenfeld, Herzliya (IL); Ofer Affias, Hod Hasharon (IL); Amit Ashkenazi, Hod Hasharon (IL)

(73) Assignee: 3D SIGNALS LTD., Kfar Saba (IL)

( * ) Notice: Subject to any disclaimer, the term of this patent is extended or adjusted under 35 U.S.C. 154(b) by 0 days.

(21) Appl. No.: 16/240,748

(22) Filed: Jan. 6, 2019

(65) Prior Publication Data

US 2020/0219527 A1    Jul. 9, 2020

(51) Int. Cl.
*G10L 25/51*      (2013.01)
*H04R 29/00*    (2006.01)

(52) U.S. Cl.
CPC .............. *G10L 25/51* (2013.01); *H04R 29/00* (2013.01); *G05B 2219/32179* (2013.01); *G05B 2219/32184* (2013.01)

(58) Field of Classification Search
CPC ... H04R 29/00; F16F 15/005; G05B 19/4184; G05B 2219/32179; G05B 2219/32181; G05B 2219/32184
USPC ....... 381/56, 58; 702/182, 183; 73/660–672; 700/108–111
See application file for complete search history.

(56) References Cited

U.S. PATENT DOCUMENTS

| | | | |
|---|---|---|---|
| 3,758,758 A | 9/1973 | Games et al. | |
| 3,903,558 A | 9/1975 | Anderson | |
| 5,822,212 A | 10/1998 | Tanaka et al. | |
| 6,173,074 B1 | 1/2001 | Russo | |
| 6,484,109 B1 * | 11/2002 | Lofall | G01H 1/003 702/56 |
| 6,507,790 B1 | 1/2003 | Radomski | |
| 6,694,285 B1 | 2/2004 | Choe et al. | |
| 6,763,312 B1 * | 7/2004 | Judd | G01H 1/003 702/56 |

(Continued)

FOREIGN PATENT DOCUMENTS

| | | |
|---|---|---|
| CN | 101709997 A | 5/2010 |
| CN | 105403730 A | 3/2016 |

(Continued)

OTHER PUBLICATIONS

U.S. Appl. No. 15/385,978 office action dated Dec. 17, 2018.

(Continued)

*Primary Examiner* — Xu Mei
(74) *Attorney, Agent, or Firm* — Kligler & Associates Patent Attorneys Ltd

(57) ABSTRACT

A method includes acquiring, by a vibro-acoustic sensor in a vicinity of a machine, vibro-acoustic signals due to an operation of the machine. The acquired vibro-acoustic signals are analyzed so as to estimate at least two operational parameters of the machine, selected from a group of the operational parameters consisting of an uptime factor, a production speed factor, and a production quality factor of the machine. An overall equipment effectiveness (OEE) of the machine is computed, the computed OEE including at least one of a minimum and a product of the at least two estimated operational parameters.

18 Claims, 3 Drawing Sheets

(56) References Cited

U.S. PATENT DOCUMENTS

| | | |
|---|---|---|
| 6,778,894 B2 | 8/2004 | Beck et al. |
| 6,843,044 B2 | 1/2005 | Clauss |
| 7,752,665 B1 | 7/2010 | Robertson |
| 7,797,130 B1* | 9/2010 | Silberg .................. G06Q 10/04 |
| | | 702/179 |
| 7,881,881 B2 | 2/2011 | Giurgiutiu et al. |
| 7,940,189 B2 | 5/2011 | Brown et al. |
| 8,554,494 B2 | 10/2013 | Adnan et al. |
| 8,595,831 B2 | 11/2013 | Skare |
| 8,600,627 B2 | 12/2013 | Beck |
| 8,607,093 B2 | 12/2013 | Dehaan et al. |
| 8,919,231 B2 | 12/2014 | Butler et al. |
| 8,964,995 B2 | 2/2015 | Cohn et al. |
| 8,983,677 B2 | 3/2015 | Wright et al. |
| 9,342,695 B2 | 5/2016 | Barkan |
| 9,378,455 B2 | 6/2016 | Yufik |
| 9,401,932 B2 | 7/2016 | Deerman et al. |
| 9,945,755 B2* | 4/2018 | Pluemer ............. G05B 19/4065 |
| 9,971,667 B1 | 5/2018 | Jenkins et al. |
| 9,989,439 B2 | 6/2018 | Thomson |
| 10,345,800 B2* | 7/2019 | Lavi ....................... G01N 29/32 |
| 10,521,193 B2* | 12/2019 | Tasaki ...................... G06F 7/20 |
| 2002/0020561 A1 | 2/2002 | Alft et al. |
| 2002/0091491 A1 | 7/2002 | Jackson et al. |
| 2002/0194915 A1 | 12/2002 | Abdel-Malek et al. |
| 2004/0117050 A1* | 6/2004 | Oskin ................. G05B 23/0267 |
| | | 700/108 |
| 2008/0271143 A1 | 10/2008 | Stephens et al. |
| 2008/0276111 A1 | 11/2008 | Jacoby et al. |
| 2008/0282781 A1 | 11/2008 | Hemblade |
| 2009/0094080 A1* | 4/2009 | Luotojarvi ......... G05B 19/4184 |
| | | 705/7.15 |
| 2010/0126258 A1 | 5/2010 | Beck et al. |
| 2011/0301882 A1 | 12/2011 | Andersen |
| 2011/0320139 A1 | 12/2011 | Amir et al. |
| 2012/0136627 A1* | 5/2012 | Jensen ............... G05B 23/0221 |
| | | 702/182 |
| 2013/0211558 A1 | 8/2013 | Mishina et al. |
| 2014/0142737 A1* | 5/2014 | Tanna .................... G06Q 10/04 |
| | | 700/99 |
| 2014/0195184 A1 | 7/2014 | Maeda et al. |
| 2014/0244192 A1* | 8/2014 | Craig .................... G01R 21/06 |
| | | 702/62 |
| 2014/0298399 A1 | 10/2014 | Heo et al. |
| 2015/0019169 A1 | 1/2015 | Cheng et al. |
| 2015/0317475 A1 | 11/2015 | Aguayo Gonzalez et al. |
| 2015/0346706 A1 | 12/2015 | Gendelman et al. |
| 2016/0004225 A1 | 1/2016 | Ellwein |
| 2016/0078365 A1 | 3/2016 | Baumard |
| 2016/0117503 A1 | 4/2016 | Reed et al. |
| 2016/0117905 A1 | 4/2016 | Powley et al. |
| 2016/0234235 A1 | 8/2016 | Jover et al. |
| 2016/0275289 A1 | 9/2016 | Sethumadhavan et al. |
| 2016/0277423 A1 | 9/2016 | Apostolescu et al. |
| 2016/0342392 A1 | 11/2016 | Tasaki |
| 2016/0377509 A1* | 12/2016 | Cloake .................. G06Q 10/20 |
| | | 702/184 |
| 2017/0285626 A1 | 10/2017 | Lavi et al. |
| 2018/0173879 A1 | 6/2018 | Shenfeld et al. |

FOREIGN PATENT DOCUMENTS

| | | |
|---|---|---|
| DE | 3907419 A1 | 9/1990 |
| EP | 0317322 A2 | 5/1989 |
| EP | 3015866 A1 | 5/2016 |
| KR | 101587827 B1 | 1/2016 |
| WO | 0171362 A1 | 9/2001 |
| WO | 03048714 A1 | 6/2003 |
| WO | 2004059399 A1 | 7/2004 |
| WO | 2008142386 A1 | 11/2008 |
| WO | 2015102730 A2 | 7/2015 |
| WO | 2016115280 A1 | 7/2016 |

OTHER PUBLICATIONS

U.S. Appl. No. 15/382,765 office action dated Jan. 4, 2019.

Leclere et al., "A multi-order probabilistic approach for Instantaneous Angular Speed tracking debriefing of the CMMNO14 diagnosis contest", Mechanical Systems and Signal Processing 81, 23 pages, Mar. 24, 2016.

Microsoft Computer Dictionary, fifth edition, Microsoft Press, p. 133, 2002.

Heng et al., "Statistical analysis of sound and vibration signals for monitoring rolling element bearing condition", vol. 53, Issues 1-3, pp. 211-226, Jan.-Mar. 1998.

European Application # 16896671.1 search report dated Oct. 7, 2019.

European Application # 19205761.0 search report dated May 25, 2020.

U.S. Appl. No. 15/385,978 Office Action dated Jul. 8, 2020.

\* cited by examiner

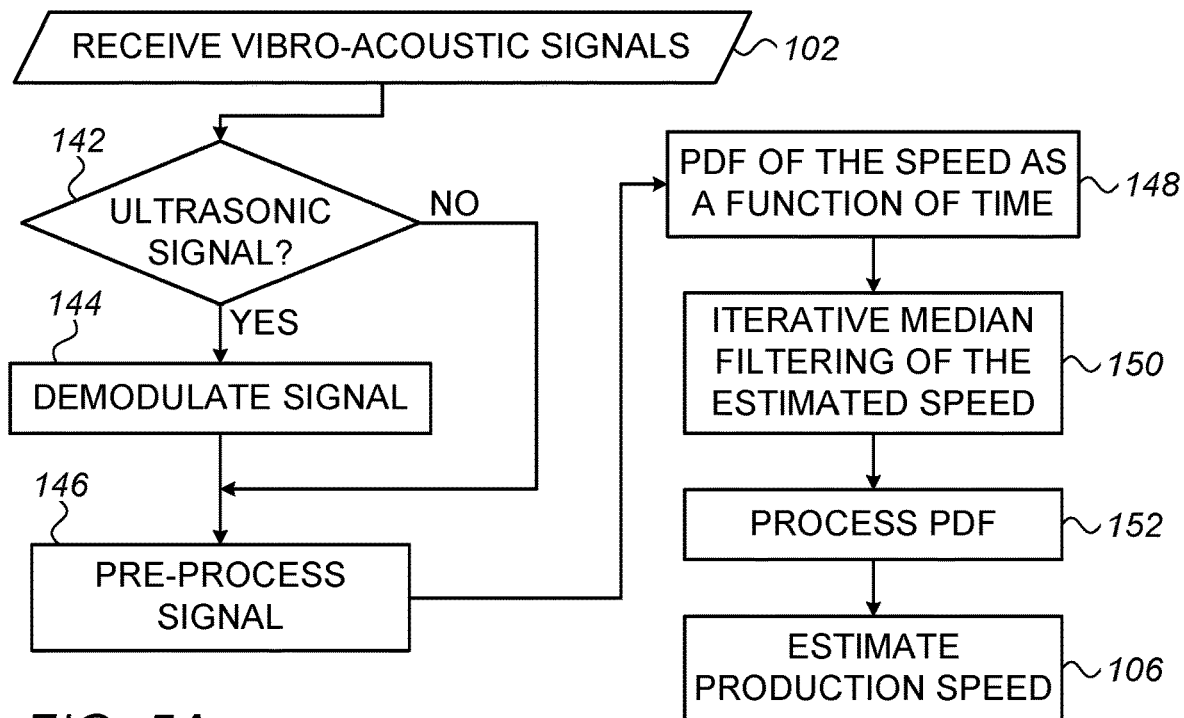
FIG. 5A
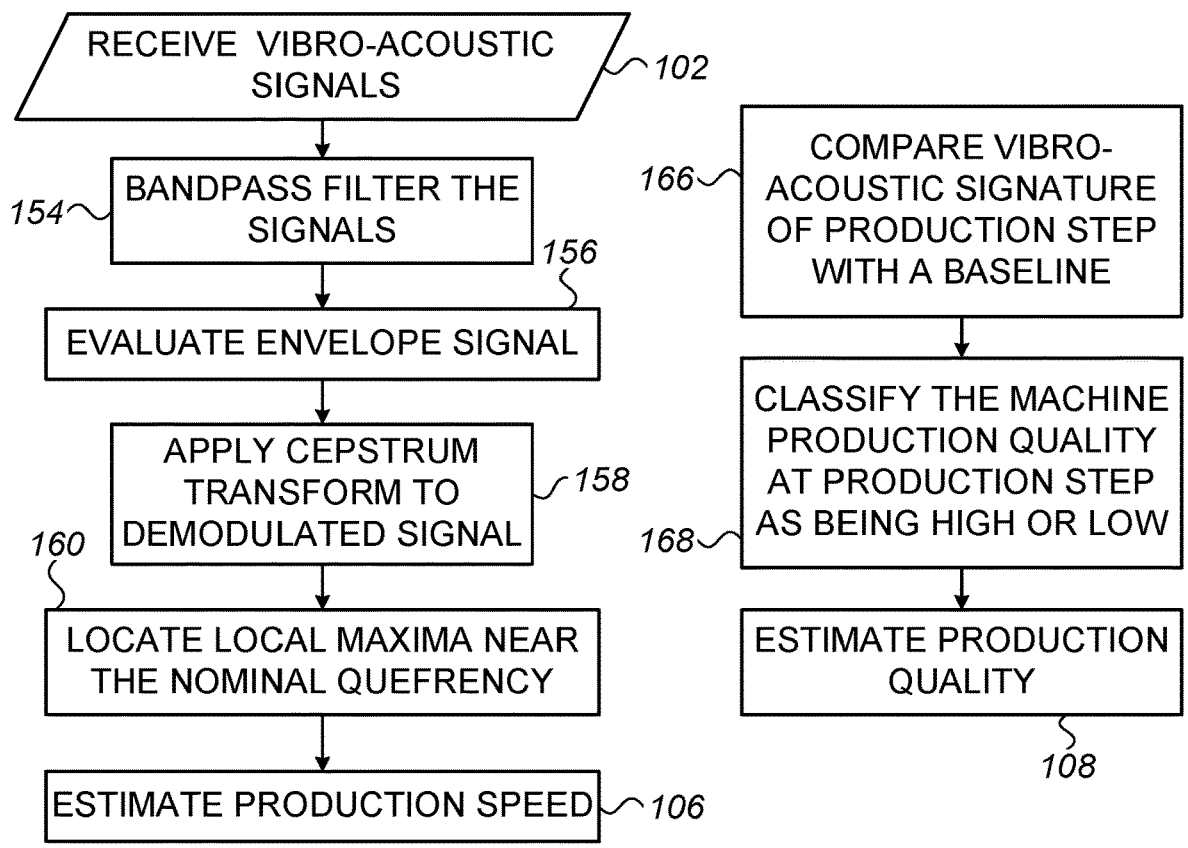
FIG. 5B
FIG. 6

EXTRACTING OVERALL EQUIPMENT EFFECTIVENESS BY ANALYSIS OF A VIBRO-ACOUSTIC SIGNAL

FIELD OF THE INVENTION

The present invention relates generally to machinery monitoring, and particularly to methods and systems for monitoring of machinery by an externally installed vibro-acoustic sensor.

BACKGROUND OF THE INVENTION

Various techniques for vibrational and acoustic monitoring of machinery are known in the patent literature. For example, U.S. Pat. No. 9,971,667 describes a system and method for local collection of sound data from industrial equipment and comparative analysis of the data. A sound detection device includes transducers mounted to continuously collect sound signals perpendicular to the electromechanical device. Digital sound data is transmitted to a remote server, which analyzes the data wherein comparative models of baseline data are associated with an operative status of the electromechanical device. Variations between the collected data and the baseline data may be associated with failure or substandard operation of the electromechanical device, wherein alerts are accordingly generated to notify a respective client user.

As another example, U.S. Pat. No. 9,945,755 describes, in an operating machine, one example of a method for monitoring operation of machinery including converting an actual sound pattern generated by the machine into an audio signal and digitizing the audio signal to create a real-time acoustic fingerprint unique to the actual sound pattern. A reference database contains a plurality of stored acoustic fingerprints, each stored acoustic fingerprint in the plurality of stored acoustic fingerprints representing a unique sound pattern associated with a particular operating condition. A controller compares the real-time acoustic fingerprint to the stored acoustic fingerprints in the reference database and generates an output in response to detection of a match between the real-time acoustic fingerprint and one of the pluralities of stored acoustic fingerprints.

U.S. Patent Application Publication 2002/0091491 describes a method and apparatus for collecting and using data. There is at least one sensor that placed within a workspace for sensing vibrations associated with at least one machine operating in the workspace. In addition, there is at least one tag associated with a particular job. The tag indicates the contemporaneous status of tasks relating to the job. At least one processor is in communication with each of the at least one acoustic sensor and at least one tag. This processor receives data relating to acoustic and task status from the at least one acoustic sensor and at least one tag. The acoustic sensor senses vibration and/or sound. A calibration phase is necessary to establish a baseline to compare against the data collected, once the hardware setup is in place. Workflow analysis and fault diagnosis and prediction are then based on data collected.

SUMMARY OF THE INVENTION

An embodiment of the present invention provides a method including acquiring, by a vibro-acoustic sensor in a vicinity of a machine, vibro-acoustic signals due to an operation of the machine. The acquired vibro-acoustic signals are analyzed so as to estimate at least two operational parameters of the machine, selected from a group of the operational parameters consisting of an uptime factor, a production speed factor, and a production quality factor of the machine. An overall equipment effectiveness (OEE) of the machine is computed, the computed OEE including at least one of a minimum and a product of the at least two estimated operational parameters.

In some embodiments, estimating the uptime factor includes classifying a root mean square (RMS) of the vibro-acoustic signal emitted by the machine as being above a given threshold.

In some embodiments, estimating the production speed factor includes demodulating the acquired vibro-acoustic signals and analyzing the demodulated vibro-acoustic signals.

In an embodiment, estimating the production speed factor includes iteratively estimating a median of the production speed and estimating a probability density function of the production speed using the iteratively estimated median.

In another embodiment, estimating the production quality factor includes comparing a vibro-acoustic signature of a production step against a baseline of prerecorded vibro-acoustic signatures for that step.

Machine production quality is classified at each compared step as being high or low based on a confidence level derived from the baseline of prerecorded vibro-acoustic signatures. Production events having a vibro-acoustic signature indicative of a low-quality production step are counted.

In some embodiments, the derived confidence level is provided in a given number of standard deviations from to a median of a statistical distribution derived from the baseline of prerecorded vibro-acoustic signatures.

In some embodiments, estimating the OEE is performed in real time while acquiring the vibro-acoustic signals.

In an embodiment, the method further includes presenting the estimated OEE to a user.

In another embodiment, the method further includes identifying and indicating that the OEE is in a declining trend.

In some embodiments, the method further includes issuing an alert when the OEE is below a given minimum.

There is additionally provided, in accordance with an embodiment of the present invention, a system including a vibro-acoustic sensor and a processor. The vibro-acoustic sensor is in a vicinity of a machine, whereas the vibro-acoustic sensor configured to acquire vibro-acoustic signals due to an operation of the machine. The processor is configured to (a) analyze the acquired vibro-acoustic signals so as to estimate at least two operational parameters of the machine, selected from a group of the operational parameters consisting of an uptime factor, a production speed factor, and a production quality factor of the machine, and (b) compute an overall equipment effectiveness (OEE) of the machine including at least one of a minimum and a product of the at least two estimated operational parameters.

The present invention will be more fully understood from the following detailed description of the embodiments thereof, taken together with the drawings in which:

BRIEF DESCRIPTION OF THE DRAWINGS

FIGS. 5A and 5B are flow charts that schematically illustrate methods for estimating production speed of rotary machines and of reciprocating machines, respectively, in accordance with embodiments of the present invention; and FIG. 6 is a flow chart that schematically illustrates a method for estimating machine production quality, in accordance with an embodiment of the present invention.

DETAILED DESCRIPTION OF EMBODIMENTS

Overview

Figure 1:
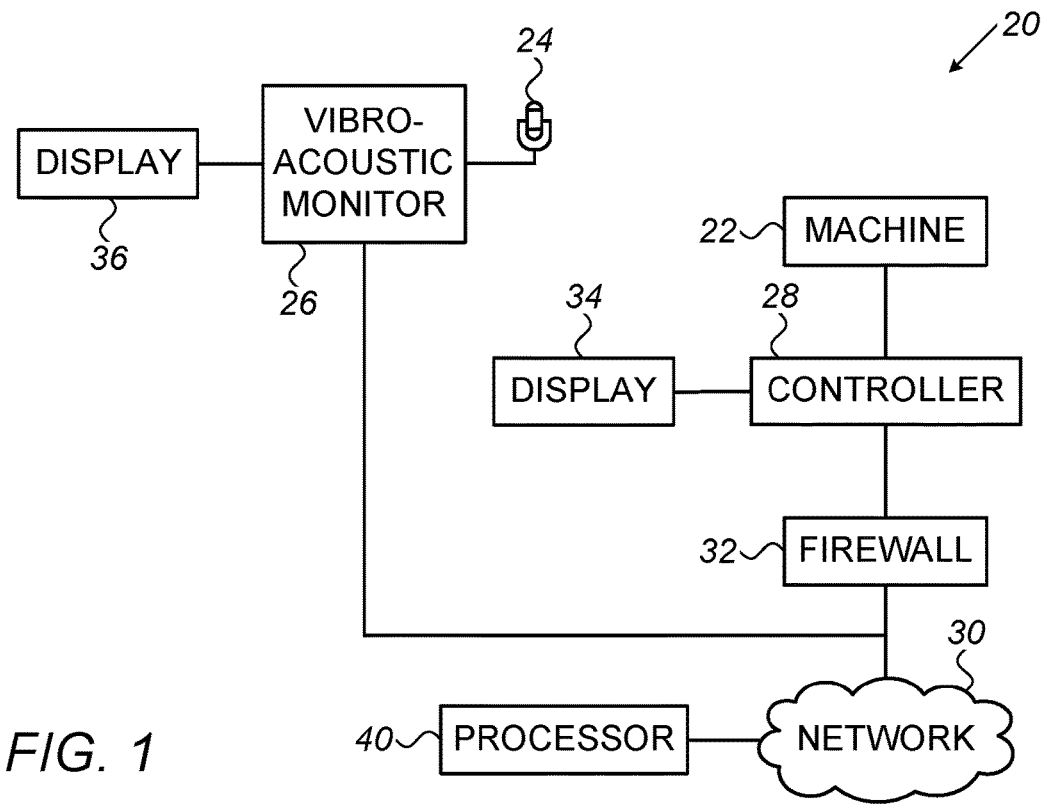
FIG. 1 is a block diagram that schematically illustrates a machine system including vibro-acoustic monitoring, in accordance with an embodiment of the invention.

Embodiments of the present invention that are described hereinafter describe methods and systems for estimating overall equipment effectiveness (OEE) of a machine by vibro-acoustically monitoring the machine. (In the context of the present description and in the claims, the term "vibro-acoustic" refers to vibrations in any or all of the sonic, infrasonic, and ultrasonic frequency ranges, as well as measurement and analysis of such vibrations.) The disclosed method estimates several operational parameters of the machine by analyzing acoustic signals passively collected from the machine, and factoring at least some of the extracted operational parameters to estimate an OEE. Typically, the disclosed estimated OEE value is correlative with the production speed and/or the overall number of outputted quality products (e.g., the products that meet a given specification). Therefore, by estimating the OEE from vibro-acoustic signals, the disclosed method provides a measure of productivity of a machine, or of a manufacturing floor comprising a group of machines.

In some embodiments, to estimate OEE, a processor estimates three operational parameters of the machine, based on analyzing the passively collected vibro-acoustic signals from the machine: (a) availability of the machine, which is defined as the ratio of the machine's actual run time to the planned production time, (b) performance, which is defined as the ideal cycle-time multiplied by the total count of cycles divided by the run time, and (c) production quality, which is defined as the ratio between good product count and the total product count.

In some embodiments the disclosed method comprises (i) acquiring, by a vibro-acoustic sensor in a vicinity of a machine, vibro-acoustic signals generated by the operation of the machine, and (ii) analyzing by a processor the acquired signals so as to estimate at least two operational parameters of the machine, selected from a group of the operational parameters consisting of the availability, the performance, and the quality, and (iii) computing an OEE of the machine based on the estimated operational parameters, for example taking a minimum and/or a product of at least two of the estimated operational parameters.

In the context of the present patent application, availability is also termed "uptime factor," performance is also termed "production speed factor," and quality is also termed "production quality factor."

The uptime factor may be measured as a ratio between the actual time used for manufacturing and the requested uptime. Thus, durations at which the machine pauses according to a plan are not included.

The production speed factor refers to an ideal time of a certain production cycle, divided by the actual cycle time. A production speed is assigned to a repetitive manufacturing process, and can, for example, characterize rotary machines, using a measure of rounds per minute (RPM), or characterize reciprocating machines, using a measure of strokes per minute (SPM).

Rotary machines typically include one or more rotating elements, such as a shaft, bearing, gear, or a rotating blade, which generate vibro-acoustic signals during rotation. Examples of rotary machines include rotating saws, turbines, and centrifugal pumps. Reciprocating machines typically include one or more elements that perform a repetitive but non-rotating cyclic motion, such as pistons and arms. Examples of reciprocating machines include pressing machines, linear-sawing machines, and piston pumps.

In some embodiments, the processor is located inside an acoustic signal monitor in the vicinity of the machine. In other embodiments, the processor is a remote processor that receives processed (e.g., digitized samples of) sound signals via a network.

The production quality factor measures the number of quality products (i.e., ones that meet given specifications) in a batch against the total products manufactured in that batch. The production quality factor may reflect a first-pass machine yield and/or reflect yield of a production process including one or more corrective actions, e.g., done by other vibro-acoustically monitored machines.

In some embodiments, the processor extracts the uptime factor based on the root mean square (RMS) of the vibro-acoustic signal emitted by the machine and classifying the RMS value as being above or below a given threshold (e.g., classifying the machine state as "machine on" or "machine-off," respectively). Using thresholding, the disclosed method can estimate the machine availability.

Alternatively or additionally, the disclosed method may apply, in some embodiments, machine-learning techniques to extract machine state based on (a) comparing a vibro-acoustic signature against a baseline (i.e., collection) of prerecorded vibro-acoustic signatures, and (b) classifying the machine state as being "machine on" or "machine-off," based on a confidence level derived from the baseline of prerecorded vibro-acoustic signatures.

In some embodiments, the processor estimates the production speed factor based on analyzing vibro-acoustic signals that are derived by demodulating an acquired ultrasound signal. In an embodiment, the processor estimates the production speed factor by digitizing sound signals into digital sound samples and analyzing the digital sound samples.

In some embodiments, the processor estimates the production quality factor based on (i) determining a distribution of the production speed factor, and (ii) counting events at which the estimated production speed factor deviates beyond a given number of standard deviations (SD) from the allowed production speed factor.

Alternatively or additionally, the processor may estimate the production quality factor based on counting production events having a vibro-acoustic signature indicative of a low quality production step. For this procedure, the processor may apply machine-learning techniques to extract machine production quality based on (a) comparing a vibro-acoustic signature of a production step against a baseline of prerecorded vibro-acoustic signatures for that step, and (b) classifying the machine production quality at that step as being high or low based on a confidence level derived from the baseline of prerecorded vibro-acoustic signatures. The processor then estimates production quality by calculating a ratio between high quality production steps count and the total production steps count.

For example, the machine output quality can be classified based on comparing the vibro-acoustic signature during manufacturing steps against one or more vibro-acoustic signatures recorded when the machine was producing with an optimal production quality.

In an embodiment, the derived confidence level is provided in a given number of standard deviations from to a median of a statistical distribution derived from the baseline of prerecorded vibro-acoustic signatures. The disclosed OEE score can be used for finding one or more reasons why a machine output is less than an expected output, for the purpose of asset performance management (APM). For example, such an OEE score-driven APM processes may comprise changing a manufacturing step based on the OEE score, where a higher target OEE value may guide a user to a specifically improved manufacturing step among many possible manufacturing step improvements, e.g., a change that is the most cost-effective.

The disclosed methods and systems that estimate an OEE score using vibro-acoustical monitoring, and which optionally apply the calculated OEE to APM, may improve the productivity of some industrial manufacturing operations. For example, based on the OEE estimated using sound analysis, a user can optimally run APM protocols so as to improve the quality and/or throughput of a manufacturing line.

System Description

FIG. 1 is a block diagram that schematically illustrates a machine system 20 including vibro-acoustic monitoring of a machine 22, in accordance with an embodiment of the invention. In addition to machine 22, machine system 20 includes a vibro-acoustic transducer 24, for example, a microphone, and a signal monitor 26, which receives vibro-acoustic signals collected (e.g., sensed) by transducer 24 from machine 22, and transmits electrical signals, which are partially processed, to a remote processor 40 via a network 30. Signal monitor 26 and transducer 24 are also referred herein collectively as "a vibro-acoustic sensor." Additionally or alternatively, embodiments of the present invention may use other types of transducers, such as accelerometers and velocity-meters.

Processor 40 analyzes the electrical signals so as to estimate at least two operational parameters of machine 22, selected from a group of the operational parameters consisting of an uptime, a production speed, and a production quality. Processor 40 then computes an OEE of machine 22, by applying a function such as minimum, or multiplication of at least two estimated operational parameters.

Machine 22 may be any electro-mechanical machine which generates noise during operation, such as pumps, motors, rotating saws, and turbines. Optionally, machine 22 repeatedly performs specific tasks, generating a repetitive vibro-acoustic signal. Optionally, machine 22 includes one or more rotating elements, such as a shaft, bearing, gear, or rotating blade, which generate vibro-acoustic signals during rotation. As another option, machine 22 includes one or more elements that perform strokes, such as pistons and/or arms, which generate vibro-acoustic signals during their periodical non-rotary motion.

In some embodiments, controller 28 controls the operation of machine 22. Optionally, controller 28 is connected to a communication network 30, such as the Internet, through which operation commands for machine 22 are received from a remote user. A firewall 32 optionally protects controller 28 from unauthorized, possibly malicious, instructions.

Typically, transducer 24 and signal monitor 26 are not coupled to machine 22 and/or a machine controller 28. Accordingly, signal monitor 26 monitors the operation of machine 22 independent of controller 28. Independent feedback on the operation of machine 22, provided by signal monitor 26, serves as a sanity check for a controller 28. An apparatus for, and a method of, cyber protection of machine 22 are described in detail in U.S. Patent Application Publication 2018/0173879, whose disclosure is incorporated herein by reference.

Transducer 24 is designed to collect acoustic signals in a frequency band including the acoustic signals generated by the operation of machine 22. In some embodiments, transducer 24 collects sonic and ultrasonic signals. Optionally, transducer 24 collects the vibro-acoustic signals passively without transmitting any activation signals. Transducer 24 may include a power source, an amplifier, and an analog to digital converter (ADC) to supply digital signals. In some embodiments, machine system 20 comprises a plurality of vibro-acoustic sensors, such as microphones, for noise cancellation.

Signal monitor 26 may be located adjacent to transducer 24 or may be remote from transducer 24 and communicate with transducer 24 through a wire and/or wireless communication link.

Processor 40 typically comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

In some embodiments, signal monitor 26 comprises a programmable pre-processing unit capable of executing software for carrying out some or all of the tasks of monitor 26 described herein, including pre-processing functions, such as demodulation, amplification, and digitization of sound signals into digital sound samples. Alternatively or additionally, vibro-acoustic signal monitor 26 comprises dedicated hardware and/or firmware which carry out some or all of the tasks of monitor 26.

In some embodiments, a display 34 coupled to controller 28 provides feedback on the operation of machine 22. Alternatively or additionally, feedback on the operation of machine 22 is provided to a remote user through communication network 30. Such feedback includes processor presenting to the remote user the estimated OEE of machine 22.

Optionally, a separate display 36, referred herein as monitor display 36, is coupled to signal monitor 26 and provides output from monitor 26. Alternatively or additionally, audio output is provided from monitor 26.

In some embodiments, processor 40 receives from controller 28 parameter values of the operation of machine 22 and uses these parameter values only to compare them to values of the parameters estimated by processor 40. In these embodiments, the coupling between processor 40 and controller 28 only allows flow of specific information from controller 28 to signal monitor 26. Alternatively or additionally, processor 40 is coupled to controller 28 in a manner allowing submission of emergency instructions, in case a problem requiring immediate intervention is detected.

Estimating OEE from Sound Analysis

Figure 2:
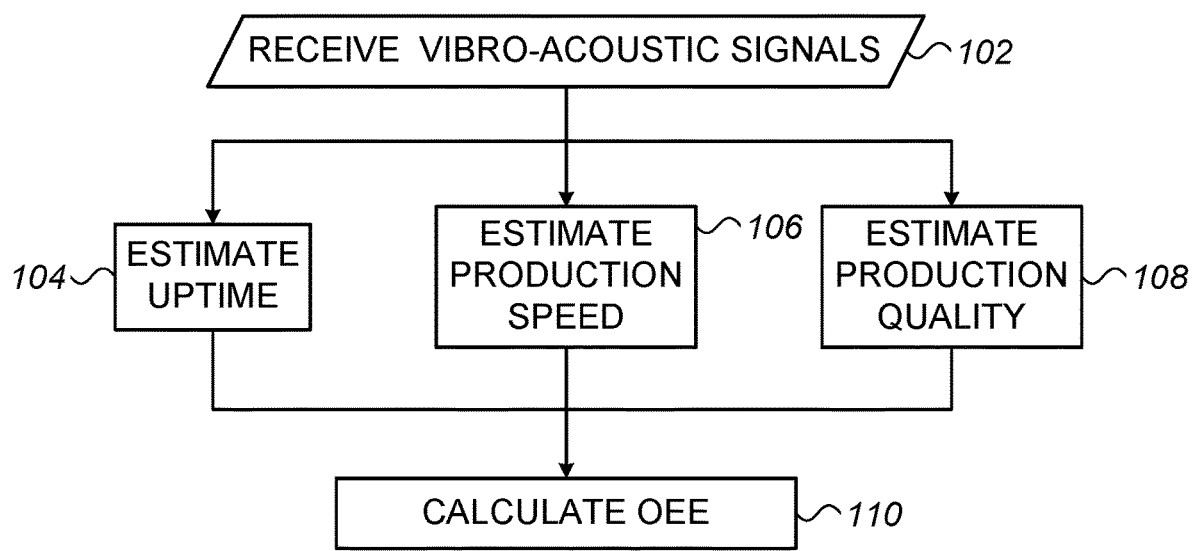
FIG. 2 is a flow chart that schematically illustrates a method for estimating overall equipment effectiveness (OEE) by analysis of vibro-acoustic signals, in accordance with an embodiment of the present invention.

FIG. 2 is a flow chart that schematically illustrates a method for estimating overall equipment effectiveness (OEE) by analysis of vibro-acoustic signals, in accordance with an embodiment of the present invention. The process begins with monitor 26 receiving vibro-acoustic signals collected by transducer 24, at a receiving acoustic signal step 102. Monitor 26 partially processes the signals (e.g., performs filtration, amplification, and digitization), and transmits the partially processed signals to remote processor 40 via network 30.

Processor 40 analyzes the received information, such as digital sound samples, so as to estimate operational parameters of machine 22 at an availability estimation step 104, where processor 40 estimates the uptime. In parallel, at a performance estimation step 106, processor 40 estimates the production speed. Also, in parallel, at a performance estimation step 106, processor 40 estimates the production quality of machine 22, at a quality estimation step 108.

Processor 40 then computes an overall equipment effectiveness (OEE) of machine 22, including a product of at least two estimated operational parameters, at an OEE calculation step 110.

Only the most relevant steps are shown, in general, in the highly simplified flow chart of FIG. 2. More detailed examples of methods for estimating the values of the three operational parameters are described below in FIGS. 4-6.

Figure 3:
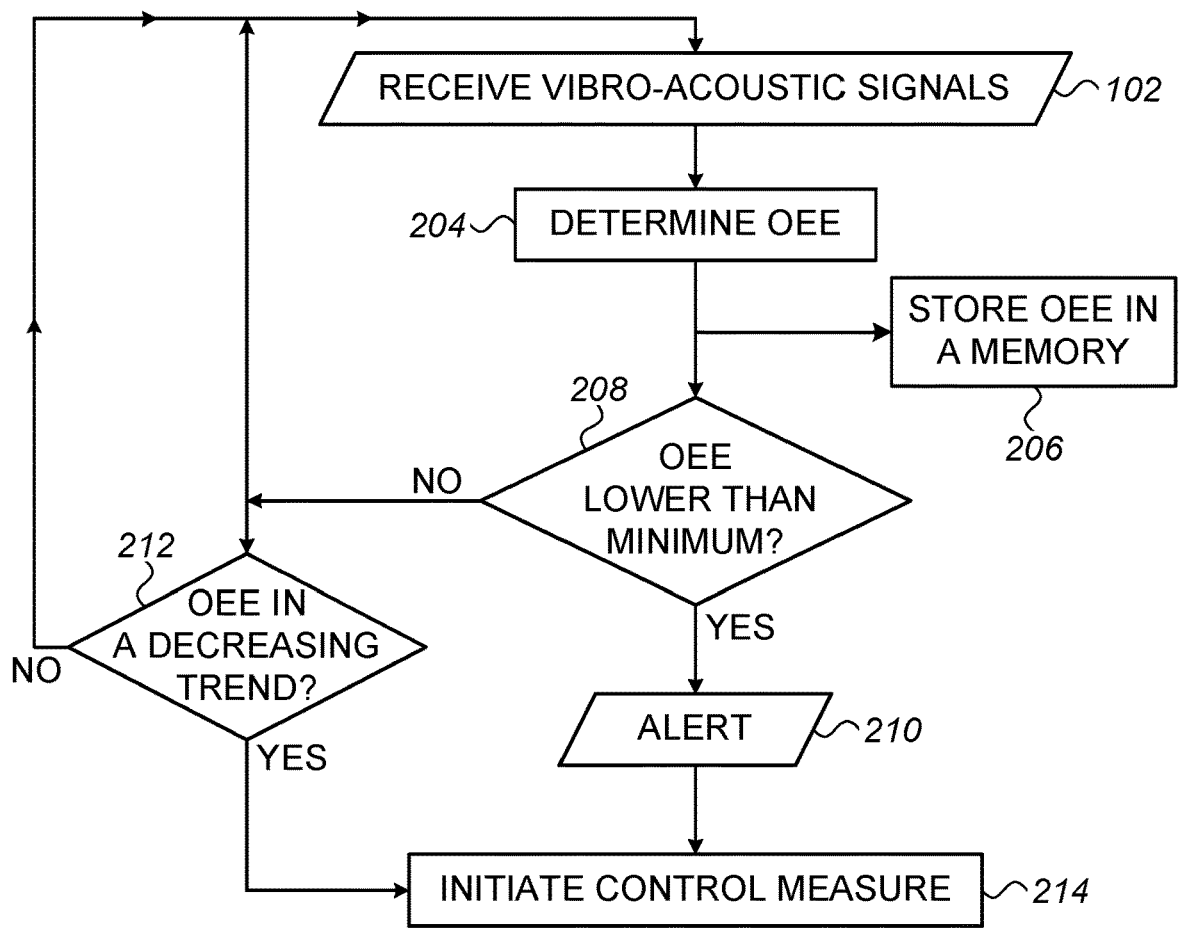
FIG. 3 is a flow chart of actions performed by elements of the machine system of FIG. 1, that include estimating OEE by analysis of vibro-acoustic signals, in accordance with an embodiment of the present invention.

FIG. 3 is a flow chart of acts performed by elements of machine system 20 of FIG. 1, that include estimating OEE by analysis of vibro-acoustic signals, in accordance with an embodiment of the present invention. As in FIG. 2, the process begins with monitor 26 receiving vibro-acoustic signals collected by transducer 24, at a receiving vibro-acoustic signal step 102.

Next, at an OEE determination step 204, which covers steps 104-110 shown in FIG. 2, processor 40 determines the OEE of machine 22. Processor 40 then stores the estimated OEE value in a memory, at an OEE storing step 206.

At an OEE evaluation step 208, processor 40 checks if the OEE is above a given minimum (i.e., if the monitored production process is within given specifications). If the OEE is above the given minimum, processor 40 accepts a new set of signals and repeats the evaluation. If the OEE falls below the given minimum, processor 40 issues an alert, at an alerting low OEE step 210. In some embodiments, the alert is provided to a human operator. Alternatively or additionally, operations, which may be automatic, are initiated in response to the alert, at a control measure initiation step 214.

In some embodiments, processor 40 repeatedly registers the OEE values and the values of the three operational parameters over time and presents a trend of the OEE and/or the operational parameters of machine 22. For example, a decreasing trend may be predicative of the estimated OEE value about to fall under the minimum, and preventive actions may follow so as to stabilize or increase the OEE value. Therefore, at an OEE trend evaluation step 212, processor 40 checks the OEE trend. If the OEE trend is sufficiently stable, processor 40 accepts a new set of signals and repeats the evaluation. If the OEE is determined by processor 40 to be in a decreasing trend, processor 40 initiates operations, which may be automatic, in response to the decreasing trend in OEE, at the control measure initiation step 214.

The automatic operations in response to evaluation steps 208 and 212 may include, for example, a shutdown of machine 22, rerouting of work orders to another similar machine with higher OEE score, or a change in its operation parameters. In some embodiments, the automatic operations may include further tests.

The automatic operations are optionally selected in response to a specific operational parameter value estimated in the process of determining the OEE. For example, when a parameter has a value which is outside of a prescribed range by a large extent, an immediate automatic intervention is performed, while if the discrepancy of the value is small, further tests are performed.

The actions of the method of FIG. 3 may be carried out in response to user instruction, or according to a predetermined schedule, such as once an hour or once a day. Alternatively, the actions are carried out continuously, for example every second or every minute.

Estimating Operational Parameters from Vibro-Acoustic Signal Analysis

Uptime Estimation

Figure 4:
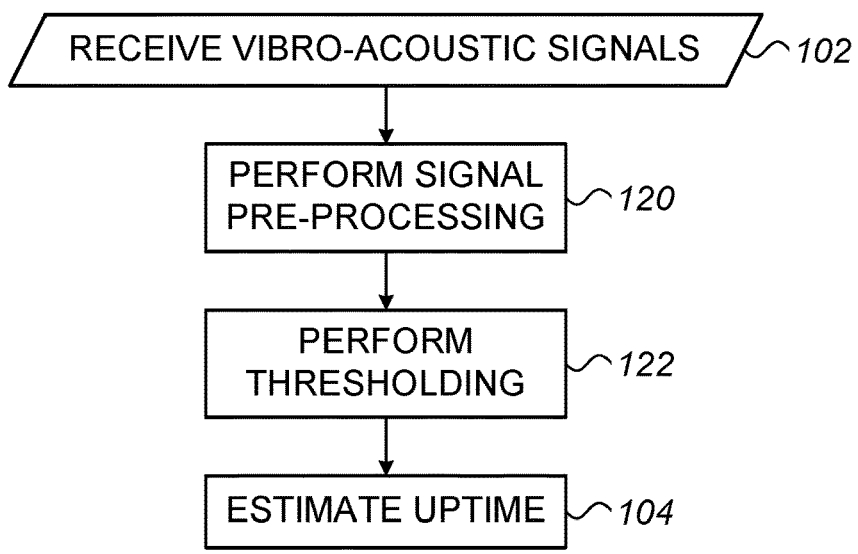
FIG. 4 is a flow chart that schematically illustrates a method for estimating machine uptime, in accordance with an embodiment of the present invention.

FIG. 4 is a flowchart that schematically illustrates a method for estimating machine uptime, in accordance with an embodiment of the present invention. As shown in FIG. 2, above, the process begins with monitor 26 receiving vibro-acoustic signals collected by transducer 24, at a receiving vibro-acoustic signal step 102. Next, at a signal pre-processing step 120, vibro-acoustic monitor 26 performs steps such as noise reduction or normalization using spectral whitening or balancing, and demodulation. Optionally, monitor 26 digitizes the pre-processed signal before transmitting the signal to processor 40.

Next, at a thresholding step 122, processor 40 calculates an RMS of the digital samples and compares the RMS value with a given threshold. Based on the comparison, processor 40 classifies the RMS value as being above or below a given threshold. At an uptime estimation step 104, the processor estimates the uptime based on an accumulated time at which the RMS averaged signal was above the given threshold.

The flow chart of FIG. 4 is brought by way of example. Additional or alternative methods may be used, for example, to corroborate the uptime estimation method described above. Such methods may include, for example, a machine learning method that trains a classifier on Fourier transformed digital sound samples obtained at different operational states of machine 22. Subsequently, the method uses a confidence level extracted by the classification to estimate the machine uptime factor.

Production Speed Estimation

FIGS. 5A and 5B are flow charts that schematically illustrate methods for estimating production speed of rotary machines and of reciprocating machines, respectively, in accordance with embodiments of the present invention.

Production Speed Estimation for a Rotary Machine

FIG. 5A is a flowchart that schematically illustrates a method for estimating production speed of a rotary machine, in accordance with an embodiment of the present invention.

The process begins with monitor 26 receiving vibro-acoustic signals collected by transducer 24, at a receiving vibro-acoustic signal step 102. Next, at a signal check step 142, vibro-acoustic monitor 26 checks if the received signal is ultrasonic. If the signal is ultrasonic, monitor 26 demodulates the signal into lower frequencies to extract the sound signal, at a signal demodulation step 144. Next, the sound signals are processed by monitor 26, for example, to remove noises and to digitize the signals. In addition, monitor 26 processes the signal using Short Time Fourier Transform (STFT), all under a signal processing step 146. If the received signal is sonic, processing step 146 further comprises whitening the signal (i.e., smooths all the frequency contents of the signal to the same intensity) to prevent the effects of resonances.

The digitized samples are transmitted to processor 40 and are analyzed by processor 40 to establish a probability density function (PDF) of production speed as a function of time, in a PDF calculation step 148. The PDF of the production speed is described over a given frequency range.

Next, at an iterative median speed filtration step 150, processor 40 filters the produced PDF to remove components located remotely from the median production speed value. Next, the "cleaned" PDF is processed, for example, by smoothing the filtered PDF by processor 40, at a PDF processing step 152. Finally, processor 40 estimates the production speed from the smoothed PDF, at a production speed estimation step 106.

The steps in the process shown by FIG. 5A, other than steps 144 and 150, follow a description given by Lecléré et al. in "A multi-order probabilistic approach for Instantaneous Angular Speed tracking debriefing of the CMMNO14 diagnosis contest," Mechanical Systems and Signal Processing, 81, 2016, pages 375-386.

Step 144 allow the use of acquired ultrasonic signals. Step 150 improves the certainty in the estimated production speed values.

Production Speed Estimation for a Reciprocating Machine

FIG. 5B is a flow chart that schematically illustrates a method for estimating production speed of a reciprocating machine, in accordance with an embodiment of the present invention. The process begins with monitor 26 receiving vibro-acoustic signals collected by transducer 24, at a receiving vibro-acoustic signal step 102. Next, at a signal filtration step 154, the signal is band pass filtered by monitor 26 to remove low and high frequency components about each peak (i.e., maximum) in the frequency spectrum of the signal (which has been also Fourier transformed by monitor 26).

At an evaluation step 156, processor 40 evaluates an envelope of the filtered signal about each peak. Steps 154 and 156 effectively demodulates the signal received in step 102. In step 158, processor 40 applies a Cepstrum transform to the demodulated signal (i.e., processor 40 applies an inverse Fourier transform (IFT) to the logarithm of the estimated spectrum of the signal). Alternatively, processor 40 applies autocorrelation to the demodulated signal.

Then, at maxima extraction step 160, processor 40 locates local maxima near the nominal quefrency (i.e., local maxima next to the nominal value of the stroke cycle duration of the monitored reciprocating machine). Finally, processor 40 estimates the production speed from the demodulated and smoothed PDF, at a production speed estimation step 106.

Alternatively, after performing autocorrelation, processor 40 locates the first peak, representing the shortest estimated cycle duration.

For estimating production capacity (unit counting), aggregating speed over time yields a close approximation of the number of units produced per the time period.

Production Quality Estimation

FIG. 6 is a flowchart that schematically illustrates a method for estimating machine production quality, in accordance with an embodiment of the present invention. The process begins with processor 40 comparing a vibro-acoustic signature of a production step against a baseline of prerecorded vibro-acoustic signatures for that step, at a vibro-acoustic signature comparison step 166. Next, processor 40 classifies the machine production quality at that production step as being high or low based on a confidence level derived from the baseline of prerecorded vibro-acoustic signatures, at production step classification step 168. Finally, processor 40 estimates production quality by calculating a ratio between high quality production steps count and the total production steps count, at a production quality estimation step 108.

Although the embodiments described herein mainly address improvements in efficiencies of production processes, the methods and systems described herein can also be used in other applications, such as in predicting failure in monitored machines by finding deviations from expected work patterns and gathering business intelligence (BI) insights about work-force effectiveness.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:
1. A method, comprising:
acquiring, by a vibro-acoustic sensor in a vicinity of a machine, vibro-acoustic signals due to an operation of the machine;
estimating, based on the acquired vibro-acoustic signals, an uptime factor, a production speed factor and a production quality factor of the machine, wherein estimating the production quality factor comprises:
comparing a vibro-acoustic signature of a production step against a baseline of prerecorded vibro-acoustic signatures for that step;
classifying machine production quality at each compared step as being high or low based on a confidence level derived from the baseline of prerecorded vibro-acoustic signatures; and
counting production events having a vibro-acoustic signature indicative of a low-quality production step; and computing an overall equipment effectiveness (OEE) of the machine comprising at least one of a minimum and a product of the uptime factor, the production speed factor and the production quality factor, all estimated based on the acquired vibro-acoustic signals.

2. The method according to claim 1, wherein estimating the uptime factor comprises classifying a root mean square (RMS) of the vibro-acoustic signal emitted by the machine as being above a given threshold.

3. The method according to claim 1, wherein estimating the production speed factor comprises demodulating the acquired vibro-acoustic signals and analyzing the demodulated vibro-acoustic signals.

4. The method according to claim 1, wherein estimating the production speed factor comprises iteratively estimating a median of the production speed and estimating a probability density function of the production speed using the iteratively estimated median.

5. The method according to claim 1, wherein the derived confidence level is provided in a given number of standard deviations from to a median of a statistical distribution derived from the baseline of prerecorded vibro-acoustic signatures.

6. The method according to claim 1, wherein estimating the OEE is performed in real time while acquiring the vibro-acoustic signals.

7. The method according to claim 1, and comprising presenting the estimated OEE to a user.

8. The method according to claim 1, and comprising identifying and indicating that the OEE is in a declining trend.

9. The method according to claim 1, and comprising issuing an alert when the OEE is below a given minimum.

10. A system, comprising:
a vibro-acoustic sensor in a vicinity of a machine, the vibro-acoustic sensor configured to acquire vibro-acoustic signals due to an operation of the machine; and
a processor, which is configured to:
estimate, based on the acquired vibro-acoustic signals, an uptime factor, a production speed factor and a production quality factor of the machine, wherein the processor is configured to estimate the production quality factor by:
comparing a vibro-acoustic signature of a production step against a baseline of prerecorded vibro-acoustic signatures for that step;
classifying machine production quality at each compared step as being high or low based on a confidence level derived from the baseline of prerecorded vibro-acoustic signatures; and
counting production events having a vibro-acoustic signature indicative of a low-quality production step; and
compute an overall equipment effectiveness (OEE) of the machine comprising at least one of a minimum and a product of the uptime factor, the production speed factor and the production quality factor, all estimated based on the acquired vibro-acoustic signals.

11. The system according to claim 10, wherein the processor is configured to estimate the uptime factor by classifying a root mean square (RMS) of the vibro-acoustic signal emitted by the machine as being above a given threshold.

12. The system according to claim 10, wherein the processor is configured to estimate the production speed factor by demodulating the acquired vibro-acoustic signals and analyzing the demodulated acquired vibro-acoustic signals.

13. The system according to claim 10, wherein the processor is configured to estimate the production speed factor by iteratively estimating a median of the production speed and estimating a probability density function of the production speed using the iteratively estimated median.

14. The system according to claim 10, wherein the derived confidence level is provided in a given number of standard deviations from to a median of a statistical distribution derived from the baseline of prerecorded vibro-acoustic signatures.

15. The system according to claim 10, wherein the processor is configured to estimate the OEE in real time while acquiring the vibro-acoustic signals.

16. The system according to claim 10, wherein the processor is further configured to present the estimated OEE to a user.

17. The system according to claim 10, wherein the processor is further configured to identify and indicate that the OEE is in a declining trend.

18. The system according to claim 10, wherein the processor is further configured to alert when the OEE is below a given minimum.

* * * * *